United States Patent
Hsueh

(10) Patent No.: US 8,907,630 B2
(45) Date of Patent: Dec. 9, 2014

(54) INRUSH CURRENT PROTECTION CIRCUIT

(75) Inventor: Ching-Wei Hsueh, Taina (TW)

(73) Assignee: Himax Analogic, Inc., Tainan County (TW)

( * ) Notice: Subject to any disclaimer, the term of this patent is extended or adjusted under 35 U.S.C. 154(b) by 704 days.

(21) Appl. No.: 13/006,611

(22) Filed: Jan. 14, 2011

(65) Prior Publication Data

US 2012/0182662 A1 Jul. 19, 2012

(51) Int. Cl.
- *H02H 3/22* (2006.01)
- *H02H 9/08* (2006.01)
- *H02J 7/04* (2006.01)
- *H02J 7/00* (2006.01)

(52) U.S. Cl.
CPC ....... *H02J 7/0029* (2013.01); *H02J 2007/0039* (2013.01); *Y10S 323/908* (2013.01)
USPC ........... 320/138; 323/908; 320/162; 320/160; 361/93.9; 361/111

(58) Field of Classification Search
USPC ................. 320/138, 160, 162; 361/93.9, 111; 323/276, 908
See application file for complete search history.

(56) References Cited

U.S. PATENT DOCUMENTS

| | | | | |
|---|---|---|---|---|
| 4,883,988 A | * | 11/1989 | Ide et al. | 326/66 |
| 5,545,970 A | * | 8/1996 | Parkes et al. | 323/277 |
| 5,757,170 A | * | 5/1998 | Pinney | 323/266 |
| 6,559,623 B1 | * | 5/2003 | Pardoen | 323/274 |
| 6,737,845 B2 | * | 5/2004 | Hwang | 323/284 |
| 6,807,036 B2 | * | 10/2004 | Baldwin | 361/42 |
| 6,807,039 B2 | * | 10/2004 | Priest | 361/93.1 |
| 7,266,000 B2 | * | 9/2007 | Terdan | 363/48 |
| 7,266,195 B1 | * | 9/2007 | Dupuis et al. | 379/412 |
| 7,414,335 B2 | * | 8/2008 | Hussein et al. | 307/135 |
| 7,450,354 B2 | * | 11/2008 | Tain et al. | 361/18 |
| 7,586,727 B2 | * | 9/2009 | Yamashita | 361/93.9 |
| 8,189,309 B2 | * | 5/2012 | Duryea | 361/56 |
| 8,189,314 B2 | * | 5/2012 | Henson et al. | 361/93.9 |
| 8,237,420 B2 | * | 8/2012 | Liu | 323/277 |
| 8,264,807 B2 | * | 9/2012 | Hong et al. | 361/91.5 |
| 8,400,137 B2 | * | 3/2013 | Nagumo | 323/315 |
| 2006/0050541 A1 | * | 3/2006 | Terdan | 363/70 |
| 2006/0290335 A1 | * | 12/2006 | Matsuda | 323/282 |
| 2007/0014134 A1 | * | 1/2007 | Shih | 363/52 |
| 2009/0051343 A1 | | 2/2009 | Nagumo | |

* cited by examiner

*Primary Examiner* — Richard V Muralidar
*Assistant Examiner* — Michael Dibenedetto
(74) *Attorney, Agent, or Firm* — McClure, Qualey & Rodack, LLP

(57) ABSTRACT

An inrush current protection circuit for charging a load to a target voltage, in which the inrush current protection circuit includes a first charging circuit and a second charging circuit. The first charging circuit charges a load to a first stage voltage, and there is a voltage difference existing between the target voltage and the first stage voltage. The second charging circuit charges the load form the first stage voltage to the target voltage, in which the first charge circuit charges slower than the second charging circuit.

14 Claims, 2 Drawing Sheets

INRUSH CURRENT PROTECTION CIRCUIT

BACKGROUND

1. Field of Invention

The present invention related to a charging device capable of providing inrush current protection, and more particularly, to a charging device capable of providing inrush current protection when the system is powered on.

2. Description of Related Art

With the tide of electronic devices turning towards smaller and lighter, electronic system, such as the mobile phones, the cameras and the personal digital assistants (PDAs), are used more and more frequently in daily life. For helping the users to carry the electronic system at anytime and anywhere, the electronic system are all equipped with rechargeable batteries for providing desired electric power when the electronic system operates. In general, when the electric power of the rechargeable batteries are exhausted, the electronic system can perform the recharging procedures for the rechargeable batteries by connecting to an external power source through a connecting line, such as an universal serial bus (USB), so as to maintain effective operation of the electronic system.

When the electronic system is connected to an external power source, an internal power control circuit of the electronic system switches the power source from the rechargeable battery to the external power source. At such a time, the external power source not only supplies sufficient power to the electronic system for normal operation, but also enables the recharging procedures for the rechargeable battery to replenish consumed energy of the rechargeable battery until the electronic system disconnects from the external power source.

However, when the external power source is connected to the electronic system to charge the electronic system, an instant great inrush current occurs, which impacts the internal circuits of the electronic system before the electronic system is stable. As a result, the circuit components of the electronic system might be damaged by the instant great inrush current.

Therefore, there is a need for a new device or a new circuit which can prevent the instantaneous large current from damaging the system when the system starts on.

SUMMARY

According to one embodiment of the present invention, an inrush current protection circuit for charging a load to a target voltage is disclosed. The inrush current protection circuit can prevent the instantaneous large current from damaging the system when the electronic system starts on. The inrush current protection circuit includes a first charging circuit and a second charging circuit. The first charging circuit charges a load to a first stage voltage, in which there is a voltage difference existing between the target voltage and the first stage voltage. The second charging circuit charges the load form the first stage voltage to the target voltage, and the first charge circuit charges slower than the second charging circuit.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
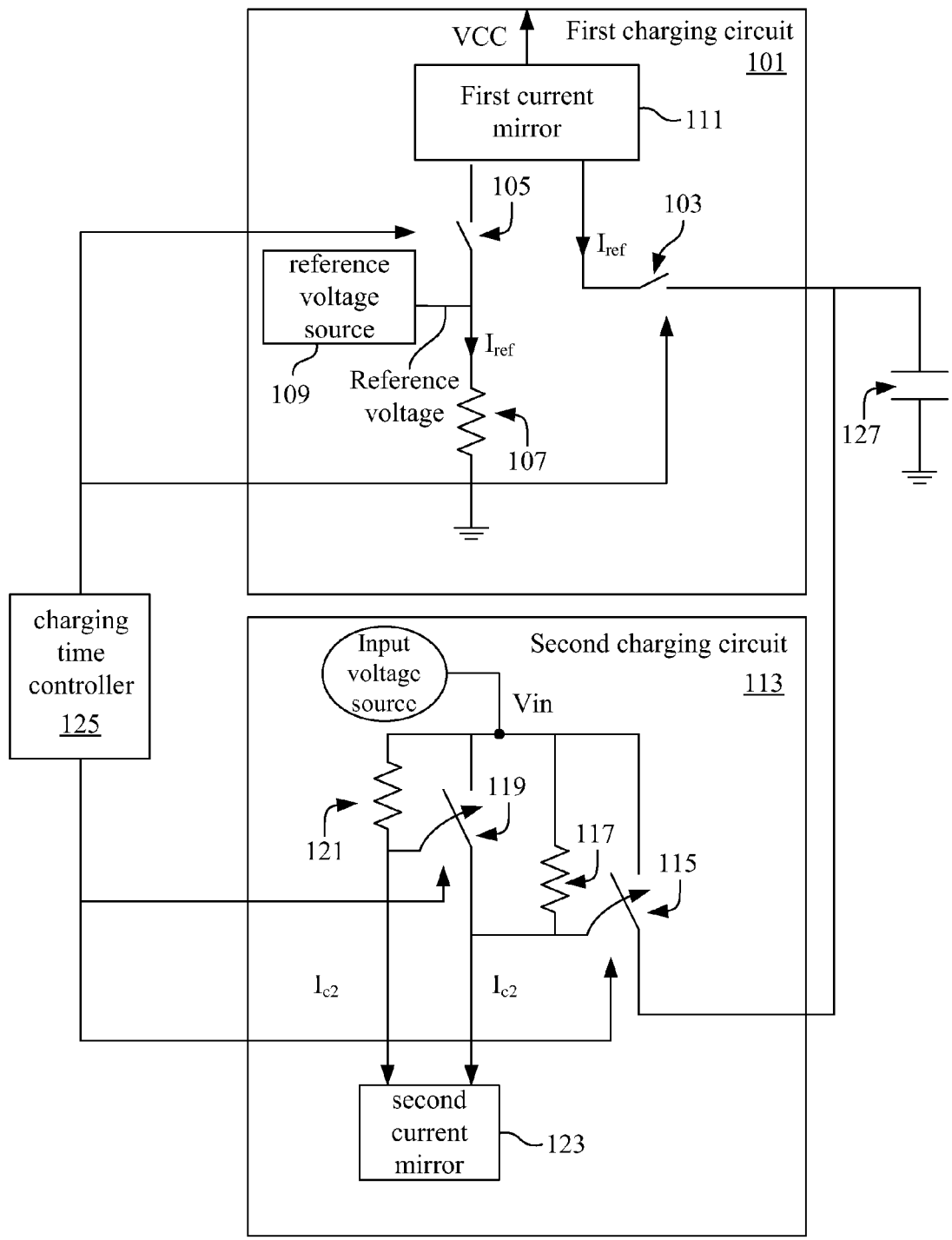
FIG. 1 shows the circuit diagram of the inrush current protection circuit according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

As the known formula $i = c\, dv/dt$ presents ("i" presenting the current, "c" presenting the capacitance, dv presenting the voltage variation, dt presenting the time variation), the volume of the current is apparently related to the voltage variation dv, and the voltage variation dv needs to be decreased if a small current i is expected. The inrush current protection circuit of the following embodiment can keep the voltage variation small by a soft start method when the electronic system starts on, which prevents the instantaneous large current from damaging the system.

FIG. 1 shows the circuit diagram of the inrush current protection circuit according to one embodiment of the present invention. The inrush current protection circuit 100 charges the load 127 to a target voltage, such as 10V or 20V, in which the inrush current protection circuit 100 includes the first charging circuit 101 and the second charging circuit 113.

The first charging circuit 101 charges the load 127 to a first stage voltage that is less than the target voltage, that is, there is a voltage difference existing between the target voltage and the first stage voltage. For example, if the target voltage is 20 V, the first charging circuit 101 might charge the load 127 to 16V in first, and the voltage difference 4V is left for second charging circuit 113 to make up.

The first charging circuit 101 includes the first current mirror 111, the first switch 105, and the second switch 103. The first switch 105 is electrically connected to the first current mirror 111, in which the first switch 105 is turned on for passing the reference current $I_{ref}$ to the first current mirror 111. The first current mirror 111 maps the reference current $I_{ref}$ onto the load 127 to charge the load 127. The second switch 103 is electrically connected between the first current mirror 111 and the load 127, in which the second switch 103 is turned on for passing the mapped reference current $I_{ref}$ to the load 127 to charge the load 127.

The first charging circuit 101 further includes the reference voltage source 109 and the time control resistor 107. The reference voltage source 109 provides the reference voltage, while the time control resistor 107 receives the reference voltage and generates the reference current $I_{ref}$ for charging the load 127. The resistance of the time control resistor 107 effects the charge time for charging the load 127. In more detail, if the reference voltage is a constant and the resistance of the time control resistor 107 decreases, the reference current $I_{ref}$ is increased. As a result, the mapped reference current $I_{ref}$ provided by the first current mirror 111 is also increased, and the load 127 can be charged to the first stage voltage more rapidly with the increased reference current $I_{ref}$.

The second charging circuit 113 charges the load 127 form the first stage voltage to the target voltage, in which the second charging circuit 113 charges faster than the first charging circuit 101. The second charging circuit 113 includes the third switch 115, the first clamp resistor 117, the fourth switch 119, and the second clamp resistor 121.

The third switch 115 is electrically connected between the load 127 and the input voltage source Vin, in which the third switch 115 charges the terminal voltage of the load 127 to the input voltage Vin given by the input voltage source. For example, if the target voltage, which is the input voltage Vin here, is 20v and the first charging circuit 101 charges the load 127 to 16V, the third switch 115 will charge the load 127 form 16V to 20V. As a result, the voltage variation made up by the second charging circuit 113 is reduced, which decreases the volume of the inrush current.

The first clamp resistor 117 is electrically connected between the input voltage source and the third switch 115 for reducing the input voltage Vin and for passing the reduced input voltage to the third switch 115. With the first clamp resistor 117, the voltage received by the third switch 115 is decreased, and the size of the third switch 115 can also be reduced.

The second charging circuit 113 further includes the fourth switch 119, the second clamp resistor 121, and second current mirror 123. The fourth switch 119 is electrically connected to the third switch 115, the first clamp resistor 117, and the input voltage source. In addition, the second current mirror 123 of the second charging circuit 113 is electrically connected to the second clamp resistor 121 for providing a constant current to the second clamp resistor 121.

The fourth switch 119 charges the terminal voltage of the load 127 to the input voltage Vin derived from the input voltage source. The second clamp resistor 121, electrically connected between the input voltage source and the fourth switch 119, reduces the input voltage Vin and passes the reduced input voltage to the fourth switch 119. With the second clamp resistor 121, the voltage received by the fourth switch 119 is decreased, and the size of the fourth switch 119 can also be reduced.

In order to make the second charging circuit 113 charge faster than the first charging circuit 101, the size of the third switch 115 and the fourth switch 119 are greater than the size of the first switch 105 and the second switch 103.

The inrush current protection circuit 100 further includes the charging time controller 125 which is electrically connected to the first charging circuit 101 and the second charging circuit 113. The charging time controller 125 controls the charging sequence of the first charging circuit 101 and the second charging circuit 113 to charge the load 127. More specifically, the charging time controller 125 makes the first charging circuit 101 charge the load 127 before the second charging circuit 113 charges the load 127. Further, the charging time controller 125 also turns on the first switch 105 as well as the second switch 103 at the same first time interval and turns on the third switch 115 as well as the fourth switch 119 at the same second time interval different from the first time interval. Therefore, the first charging circuit 101 can charge the load 127 before the second charging circuit 113 charges the load 127.

Figure 2:
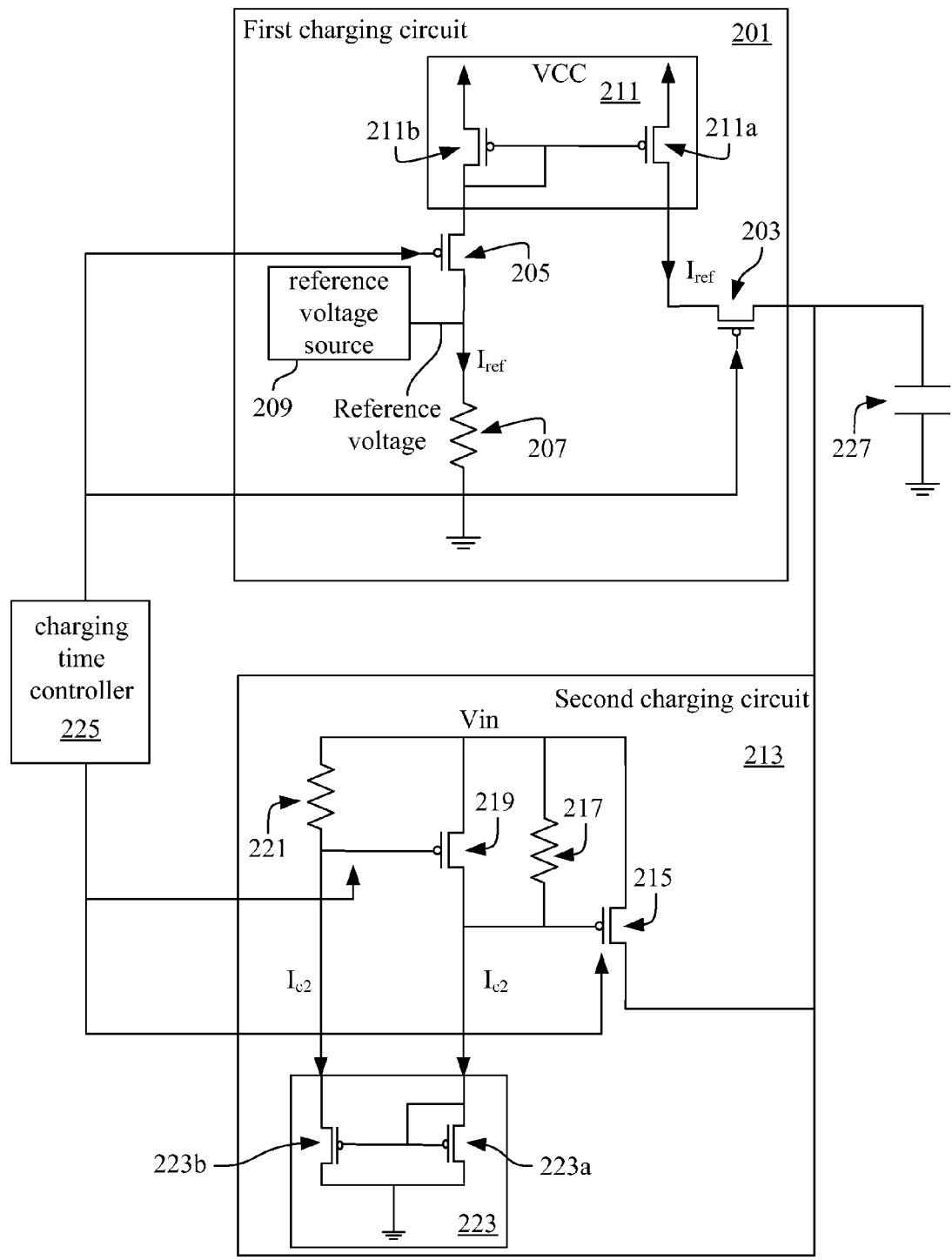
FIG. 2 shows the circuit diagram of the inrush current protection circuit according to another embodiment of the present invention.

FIG. 2 shows the circuit diagram of the inrush current protection circuit according to another embodiment of the present invention. The inrush current protection circuit 200 also includes the first charging circuit 201 and the second charging circuit 213. The first charging circuit 201 charges the load 227 to a first stage voltage that is less than the target voltage, while the second charging circuit 213 charges the load 227 from the first stage voltage to the target voltage, in which the second charging circuit 213 charges faster than the first charging circuit 201.

The first charging circuit 201 includes the first current mirror 211, the first switch 205, the second switch 203, and the reference voltage source 209. The first switch 205, the second switch 203, the current mirror 211, and the reference voltage source 209 operate similarly as the first switch 105, the second switch 103, the current mirror 111, and the reference voltage source 109 shown in FIG. 1. The first switch 205 and the second switch 203 are power MOS transistors implemented with PMOS transistors. In this embodiment shown in FIG. 2, the current mirror 211 is implemented with the PMOS transistor 211a and the PMOS transistor 211b configured as shown in FIG. 2.

The second charging circuit 213 includes the third switch 215, the first clamp resistor 217, the fourth switch 219, the second clamp resistor 221, and the second current mirror 223 which operate similarly as the third switch 115, the first clamp resistor 117, the fourth switch 119, the second clamp resistor 121, and the second current mirror 123 shown in FIG. 1. In this embodiment, the second current mirror 213 has the PMOS transistor 223a and PMOS transistor 223b configured as shown in FIG. 2, while the third switch 215 and the fourth switch 219 are power MOS transistors implemented with the PMOS transistors.

With the first clamp resistor 217 and the second clamp resistor 221, the voltage respectively received by the third switch 215 and the fourth switch 219 is decreased; therefore, the gate source junctions of the third switch 215 and the fourth switch 219 (PMOS transistors) endure less voltage drop than their drain source junctions. As a result, transistors, such as 5V/40V transistor, can be used to implement the third switch 215 and the fourth switch 219.

According to the above embodiment, the inrush current protection circuit can charge the load by two stage and can keep the voltage variation small in the second stage by the soft start method when the electronic system starts on, which prevents the instantaneous large inrush current from damaging the electronic system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An inrush current protection circuit for charging a load to a target voltage, the inrush current protection circuit comprising:
    a first charging circuit for charging the load to a first stage voltage, wherein there is a voltage difference existing between the target voltage and the first stage voltage, wherein the first charging circuit further comprises:
    a reference voltage source for providing a reference voltage; and
    a time control resistor receiving the reference voltage to generate a reference current for charging the load to the first stage voltage; and
    a second charging circuit for charging the load from the first stage voltage to the target voltage, wherein the second charging circuit further comprises an input voltage source for providing the target voltage, the input voltage source charges the load to the target voltage, wherein the input voltage source is different from the reference voltage source,
    wherein the first charge circuit charges slower than the second charging circuit.

2. The inrush current protection circuit as claimed in claim 1, further comprising a charging time controller electrically connected to the first charging circuit and the second charging circuit, wherein the charging time controller controls a charging sequence of the first charging circuit and the second charging circuit to charge the load.

3. The inrush current protection circuit as claimed in claim 2, wherein the charging time controller makes the first charging circuit charge the load before the second charging circuit charge the load.

4. The inrush current protection circuit as claimed in claim 1, wherein the first charging circuit comprises:
- a first current mirror for providing the reference current onto the load to charge the load;
- a first switch electrically connected to the first current mirror, wherein the first switch is turned on for passing the reference current to the first current mirror; and
- a second switch electrically connected between the first current mirror and the load, wherein the second switch is turned on for passing the provided reference current to the load to charge the load.

5. The inrush current protection circuit as claimed in claim 4, wherein the first switch and the second switch are turned on at the same time interval.

6. The inrush current protection circuit as claimed in claim 1, wherein
the resistance of the time control resistor effects a charge time for charging the load.

7. The inrush current protection circuit as claimed in claim 4, wherein the second charging circuit comprises:
- a third switch electrically connected between the load and an input voltage source, wherein the third switch charges a terminal voltage of the load to an input voltage given by the input voltage source; and
- a first resistor electrically connected between the input voltage source and the third switch for reducing the input voltage and passing the reduced input voltage to the third switch.

8. The inrush current protection circuit as claimed in claim 7, wherein the second charging circuit further comprises:
- a fourth switch electrically connected to the third switch, the first resistor, and the input voltage source, wherein the fourth switch charges the terminal voltage of the load to the input voltage given by the input voltage source; and
- a second resistor electrically connected between the input voltage source and the fourth switch for reducing the input voltage and passing the reduced input voltage to the fourth switch.

9. The inrush current protection circuit as claimed in claim 8, wherein the second charging circuit further comprises a second current mirror electrically connected to the second resistor for providing a constant current to the second resistor.

10. The inrush current protection circuit as claimed in claim 8, wherein the third switch and the fourth switch are turned on at the same time interval.

11. The inrush current protection circuit as claimed in claim 8, wherein the first switch, the second switch, the third switch, and the fourth switch are power MOS transistors.

12. The inrush current protection circuit as claimed in claim 8, wherein the first switch, the second switch, the third switch, and the fourth switch are PMOS transistors.

13. The inrush current protection circuit as claimed in claim 12, wherein gate source junctions of the third switch and the fourth switch endure less voltage drops than drain source junctions of the third switch and the fourth switch.

14. The inrush current protection circuit as claimed in claim 12, wherein the size of the third switch and the fourth switch are greater than the size of the first switch and the second switch.

* * * * *